United States Patent [19]

Hoshino

[11] Patent Number: 4,790,229
[45] Date of Patent: Dec. 13, 1988

[54] LUG NUT FOR DRUM HEAD
[75] Inventor: Yoshihiro Hoshino, Nagoya, Japan
[73] Assignee: Hoshino Gakki Co., Ltd., Japan
[21] Appl. No.: 72,331
[22] Filed: Jul. 13, 1987
[30] Foreign Application Priority Data
Feb. 13, 1987 [JP] Japan .............. 62-020392[U]
[51] Int. Cl.⁴ .................................. G10D 13/02
[52] U.S. Cl. ............................................ 84/413
[58] Field of Search .............. 84/411 R, 412–420
[56] References Cited

U.S. PATENT DOCUMENTS 4,122,747 10/1978 Yamashita .................. 84/413 X
4,206,681 6/1980 Kluczynski et al. ........... 84/413 X

FOREIGN PATENT DOCUMENTS 59-16958 5/1984 Japan.

Primary Examiner—L. T. Hix
Assistant Examiner—Brian W. Brown
Attorney, Agent, or Firm—Ostrolenk, Faber, Gerb & Soffen

[57] ABSTRACT

A lug and lug nut combination for installation on the side of a body of a drum. The hollow lug has a pair of spaced apart shelves which define opposed, spaced apart abuttable surfaces. A lug nut is installed in the open end of the lug and includes a respective flange at each of the shelves defining the abuttable surfaces. A U-shaped spring wrapped around the lug nut is captured between the abuttable surfaces for preventing the lug nut from falling into or out of the lug and a window opening into the lug nut provides access to the threaded bolt inside the lug nut to hold the spring. The inward shelf contacts the inward flange of the lug nut and damps vibration.

17 Claims, 2 Drawing Sheets

FIG_1

LUG NUT FOR DRUM HEAD

BACKGROUND OF THE INVENTION

This invention relates to a means for securing a drum head to a drum, and more particularly to an improvement in the lug nut used for connecting the hoop of a musical instrument drum head to a lug on the body of the drum Musical instrument drums include a drum head at one or both ends of the drum body. The drum head is secured to the usually cylindrical body by a respective hoop for each drum head. The hoop is placed over the periphery of the drum head and the hoop is attached to the drum body. The hoop is secured to the drum by a plurality of bolts which pass through the hoop and which are threaded into nuts that are in turn received in lugs that are secured to the outside of the drum body. The lug nuts supported in the lugs are held in place by the tension on the tightened hoop bolts. Both if a bolt becomes loose and before a bolt is tightened to its respective lug nut, the lug nut is loose and may fall into the lug. On occasion, the lug nut becomes loosened from the vibration of continued playing of the drum. If the lug nut loosens during a performance, it changes the tension in the drum head and affects the pitch of the drum. The lug nut should be adjustable to be selectively tightened and loosened as needed to tighten the hoop and the drum head. Typically, the lug nut is free to rotate.

An improved lug nut which is generally prevented from falling into the lug when it is separated from the drum head tightening bolt is shown in applicant's copending application, Ser. No. 14,487, filed Feb. 13, 1987. The means disclosed does not readily prevent relative rotation of the bolt and the lug nut and does not prevent their loosening. Further, the lug nut there is not designed to damp the effects of vibration of the instrument during a performance.

SUMMARY OF THE INVENTION

Accordingly, it is the primary object of the present invention to provide a lug nut which does not fall into the lug when it is separated from its drum head tightening hoop bolt.

A further object is to provide a lug nut arrangement which is effective for preventing undesired relative rotation of the lug nut and the hoop bolt for maintaining the previously set hoop tension.

Another object of the present invention is to reduce the effect of vibration of the drum during a performance upon the degree of tightening of the hoop bolt in the lug nut.

Another object of the present invention is to enable installation of the hoop bolt into the lug nut.

The invention concerns a lug and lug nut combination, where a plurality of lugs are fastened to the exterior of the body of the drum and a respective drum head at one end of the drum body is secured to the drum body through a hoop which is bolted to each of the lugs.

Each lug comprises a hollow tube. At the end of the lug toward the drum head, there is a first opening and a lug nut is installed in that opening. The lug has two shelves near the opening which define respective opposed, spaced apart abuttable surfaces.

The lug nut is hollow and internally threaded to receive a bolt extending from the hoop. The lug nut extends through and past the shelves in the lug and includes a respective flange which engages the interior walls of each of the shelves. The lug nut has an opening in its side between the flanges in the form of a window which provides access into the lug nut for the threaded periphery of the shank of the bolt which is inserted into the lug nut.

There are lug nut support means in the form of a spring, which includes a first part, such as the web of a U-shaped spring, which extends through the second opening or window and contacts the threaded bolt within the lug nut and comprises a second part, in the form of the two legs of the U which engage the exterior of the lug nut and urge the web of the spring against the bolt. The shelves in the lug and the spring are respectively so shaped that the spring abuts one or the other of the abuttable surfaces of the lug, and this controls the movement of the lug nut to prevent its falling out or falling into the lug.

The flange on the lug that is near the opening engages the inside of the lug when the hoop bolt is tightened into the lug nut. The flange on the lug nut that is furthest into the lug contacts the interior of the shelf when a vibration occurs, which damps the vibration. Further, the shelves and the flanges on the lug nut are respectively so shaped as to cooperate to prevent rotation of the lug nut as a bolt is screw threadedly tightened into the lug nut.

DETAILED DESCRIPTION OF PREFERRED EMBODIMENT

Figure 1:
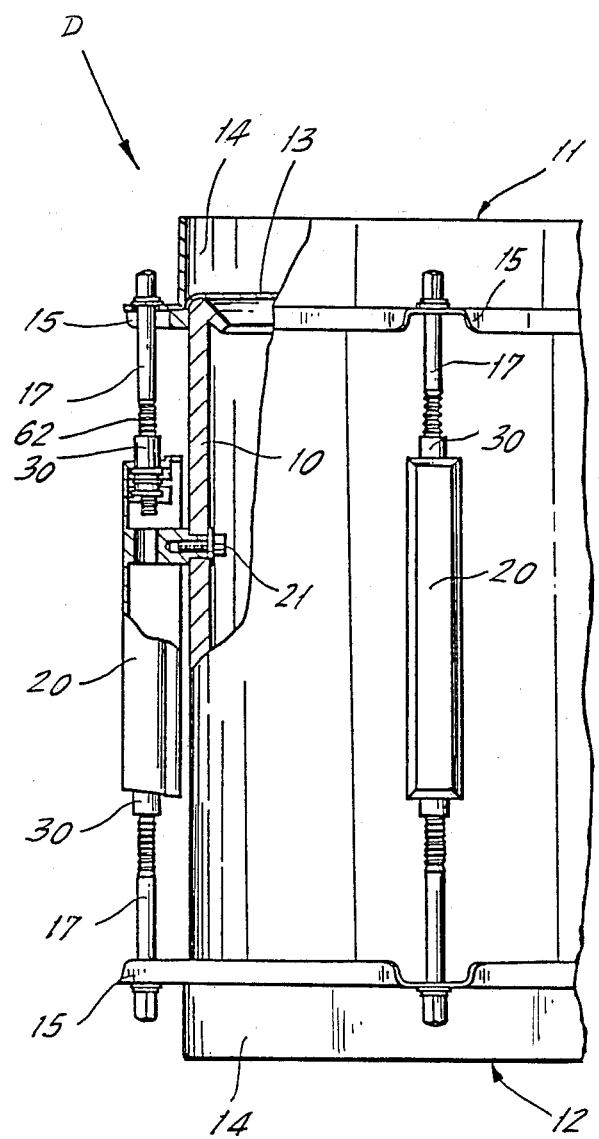
FIG. 1 is a partial elevational view of a drum showing a partial cross-sectional view of the drum head securing means, including a lug nut according to the invention.
Figure 2:
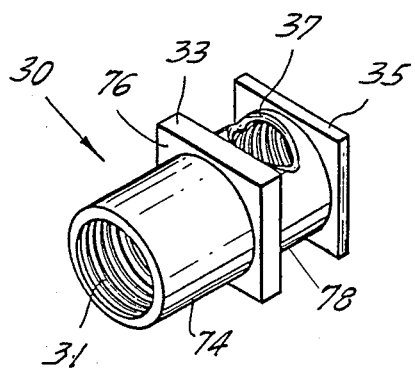
FIG. 2 is a perspective view of a lug nut according to the invention.
Figure 3:
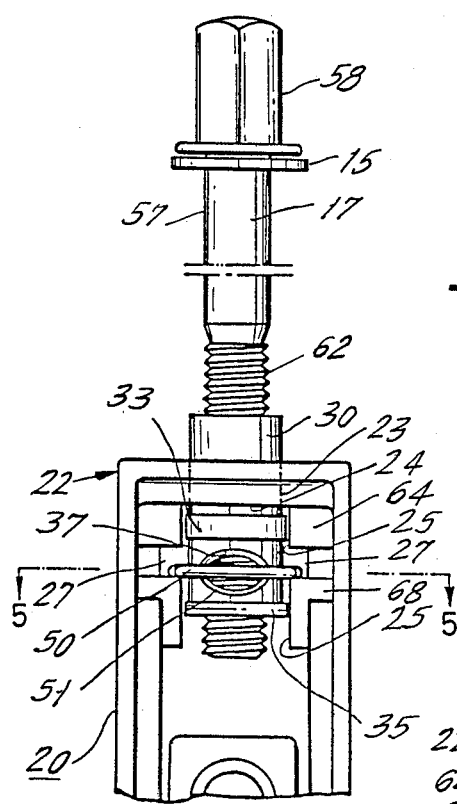
FIG. 3 is an enlarged cross-sectional view of the lug nut of the invention disposed in a lug according to the invention.
Figure 5:
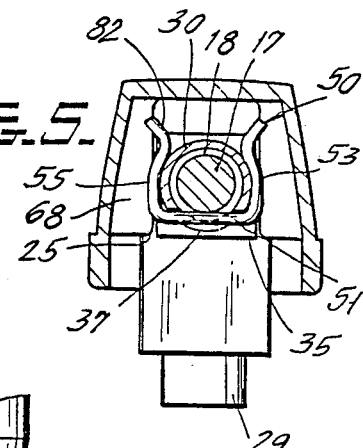
FIG. 5 is a horizontal cross-sectional view along line 5—5 of FIG. 3 looking in the direction of the arrows.
Figure 4:
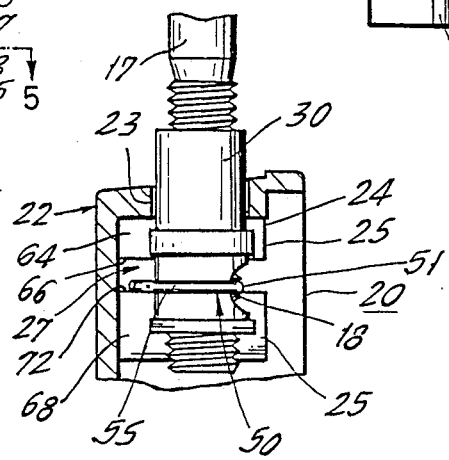
FIG. 4 is a partial vertical cross-sectional view of the lug nut of FIG. 3 taken in a direction perpendicular to the direction of view of FIG. 3.

Referring to FIG. 1, the drum D has a drum body 10 with a top end 11 and a bottom end 12. A respective drum head 13 is provided at each end 11 and 12. Each drum head 13 is clamped to the periphery of the cylindrical drum body 10 at the respective end by a known tightening hoop 14 which has a plurality of spaced apart hoop tightening, bolt receiving tabs 15 which project outwardly from the drum and have openings through them for receiving the outward ends 57 of the respective tightening bolts 17. The bolts pass through the openings in the hoop tabs and are supported by their heads 58 or by washers beneath their heads, or the like, on the tops of the tabs The bolts extend toward their threaded inward end shank portions 62, and each threaded shank 62 of a tightening bolt 17 is received in the respective threaded opening 31 of a respective lug nut 30, as described further below. Along its length, each bolt 17 may be provided with a peripheral groove 18 of a height taller than and of a depth greater than its thread for receiving spring 50, as described below For holding the hoops 14 securely to the body of the drum, a plurality of lugs 20, preferably entirely made of metal, are affixed to the outside of the drum body 10 by respective installation screws 21. The hoops 14 are shaped so that there is a respective tab 15 above each of the lugs 20. Each lug 20 is essentially a hollow shell in which a below-described lug nut 30 is disposed The lug 20 has a top end 22 with an opening 23 through it sized approximately to and slightly larger than the diameter of the lug nut shank 74 which extends through the opening 23. The top end 22 of the lug immediately beneath the opening 23 has an inner end surface 24 which defines a support abutment for the lug nut, as described below.

Immediately beneath the inner end surface 24 of the lug and inside the lug there is supported an upper, generally U-shaped shelf 64 which on its three interior sides 25 is shaped generally to the outer profile of the below described upper flange 33 of the lug nut 30. The shelf 64 has an underside 66 which cooperates with the below-described spring 50 for positioning the lug nut 30 in the lug 20.

Spaced a short distance down in the lug 20 from the shelf 64 is supported a second shelf 68 which is also U-shaped and has a three side interior that generally conforms in profile to the exterior profile of the below-described lower flange 35 on the below-described lug nut 30. The shelf 68 has a top side 72 that faces toward the bottom side 66 of the shelf 64. A short height axial space 27 is defined between the shelf sides 66 and 72 for controlling the freedom of movement of the below-described spring 50, to prevent the lug nut 30 from falling into the lug 20. The interior walls 25 of one or both of the shelves 64 and 68 lightly contact the peripheries of the respective lug nut flanges 33 and 35. Preferably, the lower flange 35 contacts the shelf 68 for damping vibration of the lug and the nut. The material of the shelves 64 and 68 may be a resin material, with some vibration absorbing capacity In particular, the shelf 68 may be of somewhat soft and vibration-absorbent material, since it is not stressed by the spring 50 when the lug nut is tightened, while the shelf 64 is possibly stressed, although that is not desired or necessary.

There is disposed in the lug 20 through its top opening 23 the lug nut 30. The lug nut 30 includes an internally threaded bore 31 extending over its entire height with threads which mate with the threaded shank 62 of the bolt 17 such that tightening of the bolt relative to the lug nut will adjust the tension on the hoop of the drum The lug nut 30 has an upper, rectangular peripheral flange 33 of a width greater than the width of the opening 23 through the top 22 of the lug, so that as the bolt 17 is tightened into the lug nut, the shank 74 of the lug nut above the flange 33 projects through the opening 23 and the top surface 76 of the flange 33 is pulled tightly against the lower surface 24 of the top 22 of the lug. By this means, the hoop 14 of the drum head is tightened. The surrounding wall 25 of the shelf 64 conforms to the external profile of the flange 33, which prohibits the rotation of the lug nut in the lug when the bolt 17 is being tightened, so that only the bolt 17 rotates relative to the non-rotated lug nut.

The lug nut 30 also has a lower flange 35 which is also of a rectangular or square shaped periphery that conforms to the shape of the wall 25 of the lower shelf 68, and which also contacts the lower shelf and helps prevent rotation of the lug nut. As the flange 35 is at the free, unattached end of the lug nut 30, the flange 35 is free to vibrate and its contact with the interior 25 of the shelf 68 helps absorb and damp vibration.

At one side of the portion 78 of the lug nut between the flanges 33 and 35, the shank of the lug nut is cut out to define the cutout window 37 which exposes the adjacent threads and particularly the spring groove 18 of the shank 62 of the bolt 17 within the lug nut, and enables the below-described spring 50 to engage the bolt which both inhibits rotation of the bolt and also prevents the lug nut from undesirably falling into the lug when the bolt 17 is not present, for example prior to installation of the bolts 17 into the respective lug nuts 30.

A lug nut holding spring 50 is provided which is approximately U-shaped It includes an intermediate web 51 which is flat and which extends through the window 37 in the lug nut and is locked into the adjacent thread and particularly the spring groove 18 of the shank 62 of the bolt. The spring web 51 presses on the shank 62, not to completely prevent its rotation, but by friction and possibly by the incline of the threads to inhibit the rotation of the bolt, so that vibration of the drum does not result in undesired rotation of the bolt 17 and a change in the drum head tension. The web 51 in the groove 18 of the bolt shank 62 causes the entire spring 50 to move through the space 27 together with the lug nut 30, for reasons to be described.

The spring 50 has two spring legs 53 and 54 which are joined by the web 51 and which are normally self-biased inwardly to wrap around the exterior of the shank portion 78 of the lug nut 30. The legs 53 and 55 terminate in out-turned installation tabs 82 which are out-turned sufficiently that the spring may be pushed onto the lug nut from the side in which the window 37 is formed The spring arms 53 and 55 are of sufficient length and are curved so as to continuously bias the spring web 51 against the bolt shank 62. The above-described shelves 64 and 68 have surfaces 25 defining the openings for the flanges 33 and 35 which approximate the profiles of those flanges. The arms 53 and 55 of the spring therefore do not fit inside the surfaces 25. Instead, the spring arms 53 and 55 are trapped between the shelf surfaces 66 and 72. This positions the lug nut 30 in the lug 20 and prevents it from shifting along the lug As a result, with the bolt 17 out of the lug nut, the cooperation of the spring 50 with the shelves 64 and 68 prevents the lug nut from either falling into the lug or falling out of the lug. Also, when the bolt 17 is first introduced into the lug nut 30, the spring 50 resting upon the shelf 68 holds the lug nut in position that the bolt shank 62 may be installed in the lug nut as the bolt is tightened. As noted above, the spring in place does not prohibit the rotation and therefore the tightening of the bolt 17 to the desired extent.

Although the present invention has been described in connection with a preferred embodiment thereof, many other variations and modifications will now become apparent to those skilled in the art. It is preferred, therefore, that the present invention be limited not by the specific disclosure herein, but only by the appended claims

What is claimed is:

1. A lug and lug nut combination for a musical instrument drum, and the like, comprising:
  a hollow lug for being attached to a musical instrument drum, or the like, the lug having an end and a first opening through that end; first and second abuttable surfaces supported spaced apart in the hollow of the lug near the end thereof;

a lug nut including a shank for extending through the first opening in the lug; the lug nut being sized in the lug to pass by the surfaces without abutting the surfaces in moving thereby; the lug nut being internally threaded for screw threadedly receiving a threaded bolt therethrough; the lug nut including a second opening therethrough in the portion thereof inside the lug for providing access to the bolt threaded into the lug;

lug nut support means carried on the lug nut and including a first part extending into the second opening of the lug nut for contacting and for pressing upon the bolt to inhibit rotation of the bolt in the lug nut and the support means comprising a second part of a size and shape that the second part will abut one or the other of the first and second surfaces as the lug nut is moved in directions which would move the lug nut out of the lug through the first opening as the threaded bolt is tightened or into the lug away from the first opening.

2. The combination of claim 1, further comprising a threaded bolt having a shank threaded complementary to the internally threaded lug nut for being threaded into the lug nut and past the window of the lug nut.

3. The combination of claim 1, further comprising a first shelf in and supported in the lug and a second shelf in and supported in the lug, the first surface being defined on the first shelf in the lug and the second surface being defined on the second shelf in the lug.

4. The combination of claim 3, wherein the lug nut is shaped for contacting at least one of the shelves, and the shelf being of such a material and the contact between the shelf and the lug being such as to absorb vibration.

5. The combination of claim 4, wherein at least one shelf is shaped in an external profile to cooperate with the external profile of the lug nut as to prohibit rotation of the lug nut when a bolt is screw threadedly tightened into the lug nut.

6. The combination of claim 3, wherein at least one shelf is shaped in an external profile to cooperate with the external profile of the lug nut as to prohibit rotation of the lug nut when a bolt is screw threadedly tightened into the lug nut.

7. The combination of claim 3, wherein both of the first and second shelves are internally profiled and the lug nut is externally profiled to cooperate with the profiles of the first and second shelves to prohibit rotation of the lug nut as a bolt is screw threadedly tightened into the lug nut.

8. The combination of claim 1, wherein the lug nut support means comprises a spring, with the second part thereof supported on the lug nut and the first part thereof extending through the second opening in the lug nut into contact with a bolt therein, and the spring having a biasing force so that the first and second parts respectively cooperate to pull the first part against the bolt in the lug nut.

9. The combination of claim 1, further comprising a shelf supported in the lug inward from the first opening; a flange on the lug nut inward from the opening for contacting the shelf, and the shelf being of such a material and the contact between the shelf and the lug being such as to absorb vibration.

10. A lug and lug nut combination for a musical instrument drum, and the like, comprising:

a hollow lug for being attached to a musical instrument drum, or the like, the lug having an end and a first opening through that end; first and second abuttable surfaces supported spaced apart in the hollow of the lug near the end thereof; a first shelf in and supported in the lug and defining the first surface; a second shelf in and supported in the lug and defining the second surface;

a lug nut including a shank for extending through the first opening in the lug; the lug nut being sized in the lug to pass by the surfaces without abutting the surfaces in moving thereby; the lug nut being internally threaded for screw threadedly receiving a threaded bolt therethrough; the lug nut including a second opening therethrough in the portion thereof inside the lug for providing access to the bolt threaded into the lug;

lug nut support means carried on the lug nut and including a first part extending into the second opening of the lug nut for contacting the bolt in the lug nut and comprising a second part of a size and shape that the second part will abut one or the other of the first and second surfaces as the lug nut is moved in directions which would move the lug nut out of the lug through the first opening or into the lug away from the first opening;

a first and a second flange defined on the lug nut and each flange having a respective exterior profile facing outwardly toward the shelves; the first and second shelves in the lug having internal profiles facing inwardly toward the flanges for cooperating with the external profiles of the respective first and second flanges for prohibiting rotation of the lug nut in the lug.

11. The combination of claim 10, wherein the second opening in the lug nut is disposed along the lug nut between the first and second flanges.

12. The combination of claim 10, wherein the lug nut support means comprises a spring, with the second part thereof supported on the lug nut and the first part thereof extending through the second opening in the lug nut into contact with a bolt therein, and the spring having a biasing force so that the first and second parts respectively cooperate to pull the first part against the bolt in the lug nut.

13. The combination of claim 12, wherein the spring is generally U-shaped, the first part of the spring is defined by a web of the U-shape, the second part of the spring comprises two legs of the U-shape which wrap around the lug nut and pull the web of the U-shape against the threaded shank of a bolt in the lug nut.

14. A lug and lug nut combination for a musical instrument drum, and the like, comprising:

a hollow lug for being attached to a musical instrument drum, or the like, the lug having an end and an opening through that end; first and second abuttable surfaces supported spaced apart in the hollow of the lug near the end thereof;

a first shelf in and supported in the lug and a second shelf in and supported in the lug, the first surface being defined on the first shelf in the lug and the second surface being defined on the second shelf in the lug;

a lug nut including a shank for extending through the opening in the lug; the lug nut being sized in the lug to pass by the surfaces without abutting the surfaces in moving thereby; the lug nut being internally threaded for screw threadedly receiving a threaded bolt therethrough;

lug nut support means carried on the lug nut and including a part of a size and shape that the part will abut one or the other of the first and second surfaces as the lug nut is moved in directions which would move the lug nut out of the lug through the opening as the threaded bolt is tightened or into the lug away from the opening;

a first and a second flange defined on the lug nut and each flange having a respective exterior profile facing outwardly toward the shelves; at least one of the first and the second shelves in the lug having internal profiles facing inwardly toward the flanges for cooperating with the external profiles of the respective first and second flanges for prohibiting rotation of the lug nut in the lug.

15. The combination of claim 14, further comprising a shelf supported in the lug inward from the first opening; one of the abuttable surfaces being defined on the shelf a flange on the lug nut inward from the opening for contacting the shelf, and the shelf being of such a material and the contact between the shelf and the flange being such as to absorb vibration.

16. In combination, a musical instrument drum comprising a drum body with a peripheral wall and an open end, a drum head over the open end of the drum, a hoop for engaging the drum head and for clamping the drum head to the open end of the drum body, a plurality of bolt receiving means on the hoop each for receiving a respective bolt;

a plurality of lug and lug nut combinations disposed around the drum body; each of the combinations comprising a hollow lug for being attached to a musical instrument drum, or the like, the lug having an end and a first opening through that end; the lug ends being alignable with the bolt receiving means; first and second abuttable surfaces supported spaced apart in the hollow of the lug near the end thereof;

a lug nut including a shank for extending through the first opening in the lug; the lug nut being sized in the lug to pass by the surfaces without abutting the surfaces in moving thereby; the lug nut being internally threaded for screw threadedly receiving a threaded bolt therethrough; the lug nut including a second opening therethrough in the portion thereof inside the lug for providing access to the bolt threaded into the lug;

a respective threaded bolt extending from the respective bolt receiving means on the hoop to each of the lug nuts;

lug nut support means carried on the lug nut and including a first part extending into the second opening of the lug nut for contacting the bolt in the lug nut and comprising a second part of a size and shape that the second part will abut one or the other of the first and second surfaces as the lug nut is moved in directions which would move the lug nut out of the lug through the first opening as the threaded bolt is tightened or into the lug away from the first opening.

17. The drum of claim 16, wherein the lug nut support means comprises a spring, with the second part thereof supported on the lug nut and the first part thereof extending through the second opening in the lug nut into contact with a bolt therein, and the spring having a biasing force so that the first and second parts respectively cooperate to pull the first part against the bolt in the lug nut.

* * * * *